United States Patent
Hecken et al.

(10) Patent No.: US 6,561,726 B1
(45) Date of Patent: May 13, 2003

(54) LINING PANEL FASTENING

(76) Inventors: Walter Hecken, Hauptstrasse 1, DE-53578 Windhagen (DE); Wolfgang Leichnitz, Saarlandstrasse 55, DE-53545 Linz am Rhein (DE)

(*) Notice: Subject to any disclaimer, the term of this patent is extended or adjusted under 35 U.S.C. 154(b) by 0 days.

(21) Appl. No.: 09/594,912

(22) Filed: Jun. 15, 2000

(30) Foreign Application Priority Data

Jun. 16, 1999 (DE) .......................... 199 27 491

(51) Int. Cl.⁷ .................. E04D 15/00; E04B 5/00
(52) U.S. Cl. .................. 403/389; 52/506.1; 52/506.05; 52/506.06; 403/388
(58) Field of Search ............... 285/45, 47, 48, 285/55; 403/389, 388, 386, 30, 28; 52/506.1, 506.05, 506.06, 512

(56) References Cited

U.S. PATENT DOCUMENTS

| 1,867,433 A | * | 7/1932 | Young ........................ 52/506.1 |
| 2,044,101 A | * | 6/1936 | Reel .......................... 52/506.1 |
| 2,046,593 A | * | 7/1936 | Urbain ....................... 52/506.1 |
| 2,083,104 A | * | 6/1937 | Thomas et al. ............. 52/506.1 |
| 3,017,673 A | * | 1/1962 | Biris ......................... 52/506.1 |
| 3,850,453 A | * | 11/1974 | Bentley et al. |
| 3,992,846 A | * | 11/1976 | Tantlinger .................. 52/506.1 |
| 4,480,371 A | * | 11/1984 | McStravick et al. |
| 4,494,346 A | * | 1/1985 | Gailey ................... 52/506.1 X |
| 4,546,580 A | * | 10/1985 | Ueno et al. .................... 52/408 |
| 4,660,861 A | * | 4/1987 | Argy et al. |
| 4,827,687 A | * | 5/1989 | Frawley .................... 52/506.06 |
| 5,746,453 A | * | 5/1998 | Roberts |
| 5,868,437 A | * | 2/1999 | Teague |
| 6,105,317 A | * | 8/2000 | Tomiuchi et al. ......... 52/506.06 |
| 6,347,495 B1 | * | 2/2002 | Conterno ............... 52/506.1 X |

* cited by examiner

Primary Examiner—Lynne H. Browne
Assistant Examiner—Ernesto Garcia
(74) Attorney, Agent, or Firm—George W. Dishong

(57) ABSTRACT

The invention relates to a lining panel fastening for panels or moldings subjected to high levels of wear on substructures or basic structures, in particular of sheet steel. It is distinguished by holding brackets which are fastened to the sheet-steel structure and in the holding region of which the wear-resistant moldings can be fastened.

6 Claims, 2 Drawing Sheets

LINING PANEL FASTENING

FIELD OF THE INVENTION

The invention relates to a lining panel fastening for panels or moldings subjected to high levels of wear on substructures or basic structures, in particular of sheet steel. Such lining panel fastenings are known per se.

BACKGROUND OF THE INVENTION

Possible as sheet steel structures which come into consideration are pipelines, of cylindrical or square cross section, ducts of metallic structures, containers, classifiers, hot-running cyclones or the like, in particular sheet-steel structures in which, for energy saving reasons or reasons of personnel protection, the temperature of the sheet steel must not exceed a temperature to be defined, for example of 80° C. On the other hand, the temperatures on the lining side are up to 1100° C., often around 750° C., and nevertheless the insulation from the sheet-steel structure, for example with respect to the container, must remain intact. The invention is also concerned with a method of fastening linings on sheet-steel substructures by means of fastening elements, in particular holding brackets, between the substructure and the molding panels of the lining, in particular when these parts providing protection against wear are subjected to high temperature.

It is known to provide an adhering laid layer between the lining or moldings and the sheet-steel structures, which may result in failure, in particular whenever the installation has to be operated at elevated temperatures. This is because, in this case, in particular where the external insulation of a steel container is concerned, for example, approximately 3 times greater thermal expansion occurs in the steel container compared to the lining with moldings, which leads to failure of the adhering laid layer.

SUMMARY OF THE INVENTION

The invention is based on the object of proposing a lining flush with the surface, without an adhering laid layer, between the molding of a structure in such a way that a solution is found to the enormous difference in the thermal stress between the sheet-steel structure and the lining moldings.

This is achieved in the case of a lining panel fastening of the type stated at the beginning by holding brackets which are fastened to the sheet-steel structure and in the holding region of which the wear-resistant moldings can be fastened. The wear-resistant moldings are preferably attached to the holding brackets by means of fastening elements and a disk. Here, the holding brackets have in their head region a hole for receiving the fastening element onto which the wear-resistant moldings are fastened. The height of the holding brackets at the same time corresponds here to the calculated insulating thickness. The material of the holding brackets may also be chosen such that it corresponds to that of the sheet-steel structure and has the same thermal changes in length as the sheet-steel structure. After the fastening of the holding brackets and the introduction of the insulating mortar onto the sheet-steel structure, to ensure protection beneath the open joints, a wear-resistant compound, for example a mechanically resistant material, is applied in a thickness of about 10 to 15 mm. Then the molding is placed in an exact position into the not yet set wear-resistant layer and is fastened. To compensate for stresses, a disk is laid between the bearing surface of the hexagonal head of the fastening element and the wear-resistant molding.

Terminating moldings can also be introduced; they can be adapted by saw cuts, a significant advantage of the measures according to the invention.

On the laying side, these wear-resistant moldings have a profiling, also referred to as an impression. This ensures a reinforcement in the region of the screwed joints in the wear-resistant molding and on the other hand a safeguard against twisting of the molding during operation. With the open end joint of about 3 mm described according to the invention, without this impression twisting would be quite conceivable with a round rosette fitted on the rear side.

The overall configuration results in minimal movements caused by a thermal change in length, for which reason forces which could have the consequence of tearing the wear-resistant moldings or the weld seams are precluded from the outset.

A wide variety of wear-resistant materials can be fastened by means of the measure according to the invention, for example those based on mineral melting products, sintered products etc.

Consequently, the layer of mechanically resistant material is applied to the insulating layer, the moldings already fastened on the rear side of the lining panels are inserted through the hole mentioned and are arranged such that they are secured against twisting. A small plate 32 terminates the outwardly facing cavity in the screw bolt head.

Results have shown that this new type of laying or fastening with open joints makes it possible to overcome the problems mentioned above, that is including thermal expansions which differ by a factor of 3. The holding bracket may in fact be of any kind desired. It may be welded against the sheet steel structure and establish the connection between its holding legs via a top plate. A graphite seal may be provided in the head of the screw bolt.

DESCRIPTION OF THE PREFERRED EMBODIMENTS

An exemplary embodiment of the invention is now to be explained in more detail with reference to the attached drawing.

Figure 1:
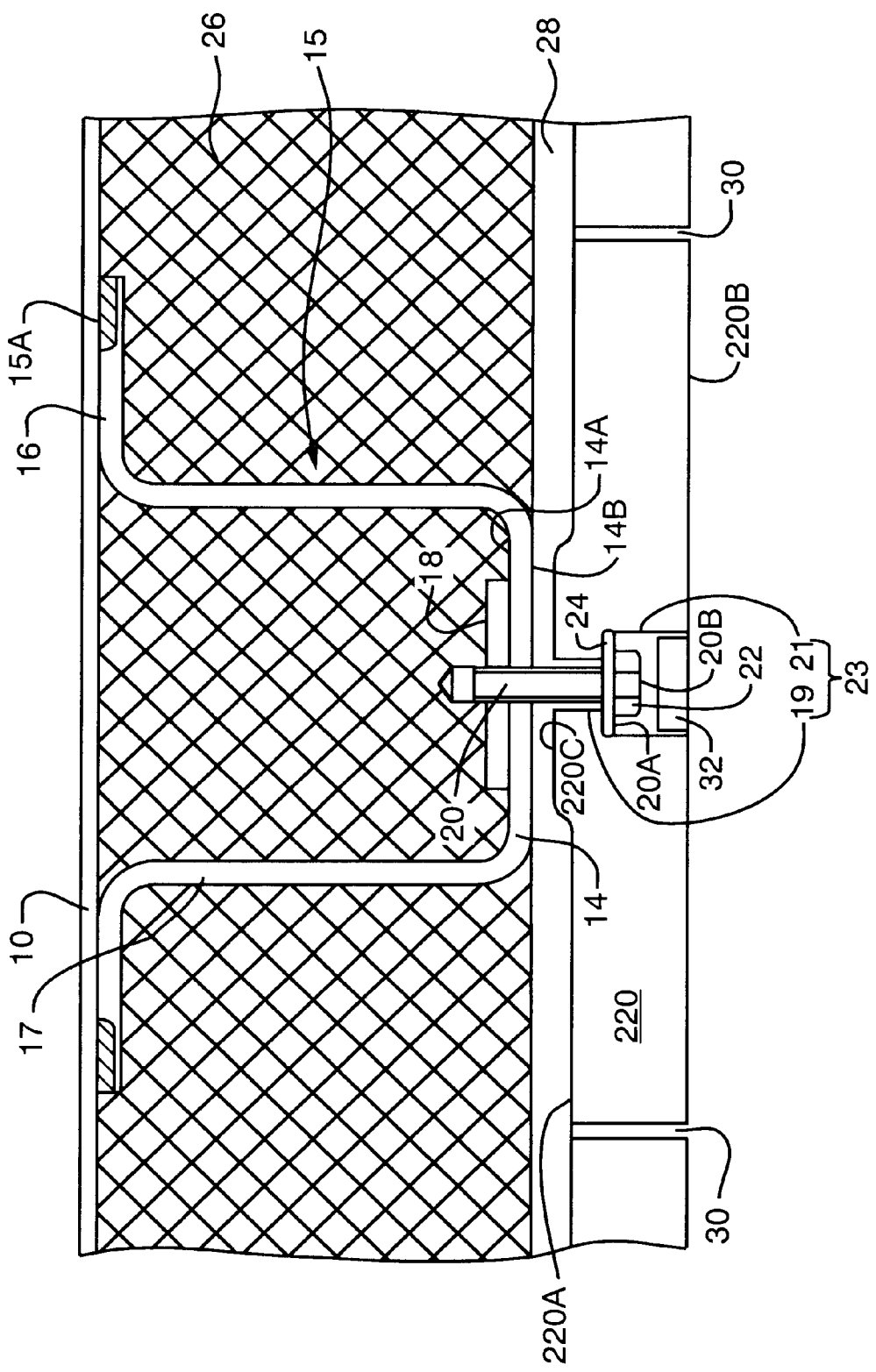
FIGS. 1 and 2 illustrate the lining panel fastening means of the present invention.
Figure 2:
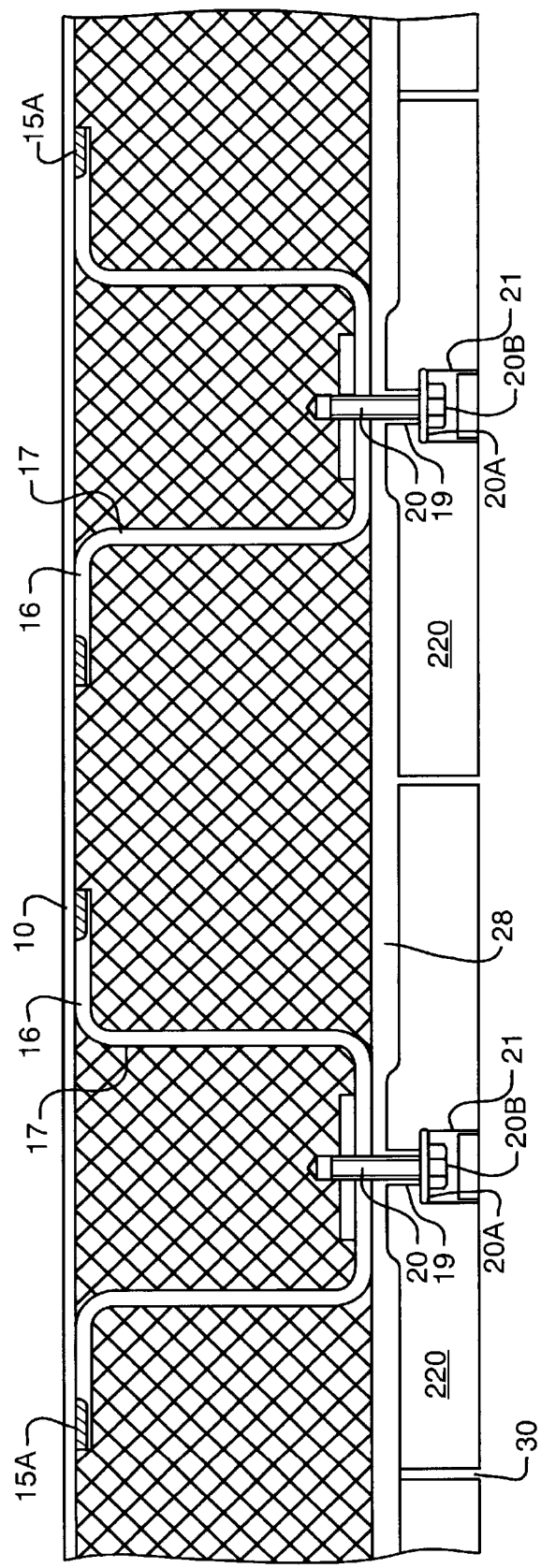

Referring now to FIGS. 1 and 2, fastened 15A, for example welded onto sheet-steel structure 10 are legs 16 of holding bracket 15. Holding bracket 15 has top plate 18 located on an inwardly directed surface 14A of holding bracket opposite side 14, opposite side 14 being spaced-apart from sheet-steel structure 10 by a distance determined by holding bracket connecting members 17. Hole 20 is centrally located and axially aligned through both holding bracket opposite side 14 and top plate 18. Further, hole 20 is preferably threaded to mate with the threaded portion of fastening element 22. Fastening element 22 is attachable to top plate 18 upon insertion through hole 20 in holding bracket opposite side 14 and forms a seal with respect to the graphite seal 24.

Molding element 220 is substantially planar with an inwardly directed surface 220A and an outwardly directed surface 220B. Preferably centrally located in molding element 220 is molding aperture 20A sized to accept threaded portion of fastening element 22. Molding aperture 20B is located on outwardly directed surface 220B and is in axial alignment with aperture 19 and is sized to accept the hex-head portion and a tool used to fit onto hex-head portion. Aperture 21 has a depth which is greater than the thickness of the hex-head portion of fastening element 22 but less than the thickness dimension of molding element 220. Aperture 19 in combination with aperture 21 may be characterized as stepped aperture 23.

On the inwardly directed surface 220A there is raised portion 220C of inwardly directed surface 220A located such that aperture 19 is within raised portion 220C. An insulation 26, the composition of which is known to a person skilled in the art, is applied in a thickness substantially equal to the distance from the inward facing surface of sheet-steel structure 10 to outwardly directed surface 14B of holding bracket opposite side 14. Applied over the surface of insulation 26 is a wear-resistant compound layer 28 (mechanically resistant material) applied in a thickness of 10 mm to 15 mm. Wear-resistant compound layer 28 is applied to ensure protection beneath end joints 30 which are created when a plurality of molding elements 220 are assembled to create the final structure. Each molding element 220 is placed in an exact position into or onto this not yet set layer of wear-resistant material 28 and fastened using fastening element 22. To compensate for stress, a disk/seal 22, preferably made of graphite, is placed between the bearing surface of the hexagonal head of fastening element 22 and where aperture 19 and aperture 21 meet to form stepped aperture 23 in wear-resistant molding 220. Then, the moldings 220 and the terminating moldings are introduced and adjusted. End joints 30 remain empty. The layer of mechanically resistant material, i.e., compound layer 28 is present as an abrasive layer, on the one hand to guard against contaminated gases or the like being blown through, on the other hand it protects the sheet-steel structure against a heat of, for example, 700° C.

What is claimed is:

1. A fastening system for attaching insulative lining to panels or moldings, said fastening system comprising: holding brackets wherein said holding brackets are fastened to a sheet-steel structure in a holding region, said holding region being configured to permit wear-resistant moldings to be fastened thereto, said fastening system being subjectable to high levels of wear on sheet steel substructures and basic structures, further comprising said wear resistant moldings, wherein said wear-resistant moldings are attached to said holding brackets by fastening elements and a graphite seal.

2. The fastening system for attaching insulative lining according to claim 1, further comprising a hole in a head region of said holding brackets, said hole for receiving said fastening elements onto which said wear-resistant moldings are fastened thereby preventing twisting of said wear-resistant moldings.

3. The fastening system for attaching insulative lining according to claim 1, further comprising a wear-resistant layer, said wear-resistant layer being a layer of mechanically resistant material, said mechanically resistant material being in contact with and positioned upon an insulative lining, and said mechanically resistant material being between said sheet-steel structure and each said wear-resistant moldings, having a thickness of substantially between about 10 mm and 15 mm with an open joint between each adjacent said wear-resistant moldings.

4. Method of fastening insulative lining on sheet-steel substructure by means of holding brackets having bracket legs, an opposing bracket side, said opposing bracket side being opposite said bracket legs and bracket connecting members, between the substructure and individual molding of the lining, said method comprising the steps of:

fastening, within a holding region, said bracket legs of said holding brackets to one surface of said sheet-steel substructure;

introducing insulative material between said one surface of said sheet-steel substructure at a thickness substantially equal to a distance from said one surface of said sheet-steel substructure to an outward-facing surface of said opposing bracket side;

placing a wear-resistive compound layer over said insulative material and said outward-facing surface of said opposing bracket side thereby creating said insulative lining;

placing said individual molding adjacent to another said individual molding leaving a space between said individual molding and said another said individual molding creating thereby end joints; and attaching said individual molding to said opposing bracket side by means of fastening elements and in contact with not yet set said wear-resistive compound layer.

5. The method according to claim 4, further comprising adjusting and readjusting said wear-resistive compound layer into which said individual molding is positioned as long as said layer is still soft as applied to said insulative lining, said adjusting and readjusting taking place by means of said fastening elements.

6. The method according to claim 4, further comprising determining, with a known operating temperature, the temperature of said sheet-steel substructure if made determinable by a suitable choice of material for said insulative lining.

* * * * *